United States Patent
DeCarolis et al.

(10) Patent No.: US 7,639,694 B2
(45) Date of Patent: Dec. 29, 2009

(54) ENHANCED UPSTREAM DATA TRAFFIC MANAGEMENT FOR EPON

(75) Inventors: Joseph G. DeCarolis, San Ramon, CA (US); Chung Liang, Santa Rosa, CA (US); Hanumanthrao Nimishakavi, Fremont, CA (US)

(73) Assignee: Centillium Communications, Inc., Wilmington, DE (US)

( * ) Notice: Subject to any disclaimer, the term of this patent is extended or adjusted under 35 U.S.C. 154(b) by 513 days.

(21) Appl. No.: 11/379,500

(22) Filed: Apr. 20, 2006

(65) Prior Publication Data

US 2007/0248109 A1 Oct. 25, 2007

(51) Int. Cl.
*H04L 12/56* (2006.01)
(52) U.S. Cl. .............. 370/395.4; 370/395.21; 370/412
(58) Field of Classification Search ............ None
See application file for complete search history.

(56) References Cited

U.S. PATENT DOCUMENTS

| | | | |
|---|---|---|---|
| 2004/0141759 A1* | 7/2004 | Stiscia et al. | 398/168 |
| 2004/0258094 A1* | 12/2004 | Bashan et al. | 370/486 |
| 2007/0071031 A1* | 3/2007 | Shin et al. | 370/468 |
| 2007/0230955 A1* | 10/2007 | Miller et al. | 398/59 |
| 2008/0212965 A1* | 9/2008 | Sisto et al. | 398/68 |

OTHER PUBLICATIONS

Ringoot, E, "Demonstration of Dynamic Medium Access Control for APON and SuperPON", Nov. 2001, Alcatel Research, vol. 3.*

* cited by examiner

*Primary Examiner*—Daniel J Ryman
*Assistant Examiner*—Tito Pham
(74) *Attorney, Agent, or Firm*—Fenwick & West LLP

(57) ABSTRACT

To enhance the upstream data traffic management in an EPON, a scheme is employed to allocate transmission windows for upstream data transmitted from the subscribers' ONUs to an OLT. The queues of a logical link are grouped into queue containers, and the OLT allocates upstream transmission windows to the queue containers. Logical links assigns the upstream transmission window allocated to a queue container to the queues in the queue containers.

14 Claims, 5 Drawing Sheets

ENHANCED UPSTREAM DATA TRAFFIC MANAGEMENT FOR EPON

BACKGROUND

1. Field of the Invention

The present invention relates in general to Ethernet Passive Optical Network (EPON) communications, and in particular to managing upstream data traffic allocations in an EPON.

2. Background of the Invention

As EPON moves into mass deployment, more people rely on this technology for network access. Because network users are using more services relying heavily on network communication, such as voice over IP and video on demand, there is growing demand on the performance of an EPON.

In an EPON, there are multiple Optical Network Units (ONUs) and one Optical Line Termination (OLT). The OLT typically resides at the Central Office (CO) and connects the EPON to one or more external networks. Each of the ONUs typically resides at a subscriber's home and connects the subscriber to the EPON. Alternatively, an ONU can be connected to multiple subscribers.

The OLT controls how data is communicated in the EPON. All data communications through the EPON must go through the OLT, including those between two ONUs of the EPON. The downstream traffic from the OLT is standard Ethernet traffic. An entity that transmits and receives data to and from the OLT within each ONU is called a logical link and is identified by a unique logical link identifier (LLID). A local link can maintain several local queues for different traffic priorities. For example, voice packets should be prioritized ahead of data packets (which may contain lower priority web or peer-to-peer traffic), therefore voice packets are placed in a queue with higher priority than the queue holding data packets. Because there are multiple ONUs in an EPON, two or more logical links from different ONUs may transmit data upstream to the OLT at the same time, causing a collision in the upstream traffic. To prevent collisions from happening, the EPON follows the control protocol described in IEEE 802.3ah.

The control protocol described in IEEE 802.3ah uses a Multi-Point Control Protocol (MPCP) to manage the upstream traffic of an EPON. According to the MPCP, each logical link reports the upstream transmission demands of its local queues to the OLT. The OLT divides the upstream transmission bandwidth into upstream transmission windows and allocates the upstream transmission windows to logical links upon request. To allocate the transmission windows, the OLT uses a Dynamic Bandwidth Allocation (DBA) algorithm. Each of the logical links in turn assigns allocated upstream transmission bandwidth to its local queues based on the demands and priorities of the local queues.

This approach is inadequate in providing quality of service to the EPON subscribers. Quality of service is a measure of performance for a transmission system that reflects its transmission quality and availability of service. The traditional approach can result in inefficient upstream bandwidth allocation, especially when a logical link supports multiple Ethernet ports. For example, when one Ethernet port generates continuous high priority upstream transmission demands, it may take over most of the bandwidth allocated to the logical link. In such a case the lower priority upstream transmission demands of the same Ethernet port and the upstream transmission demands of the other Ethernet ports of the same logical link are left to share the remaining limited transmission window.

Another problem of the traditional approach is that the allocation mechanism cannot guarantee a minimum bandwidth to a particular stream (e.g., guaranteeing the necessarily bandwidth to maintain a quality VOIP connection). Also, because the OLT allocates upstream bandwidth on a per-logical link basis only, leaving the assignment of upstream bandwidth to local queues to the logical link, it is difficult to configure or reconfigure the EPON to provide and maintain a quality of service to the subscribers.

Some applications attempt to improve the quality of service by allocating multiple logical links to one ONU, each associated with an Ethernet port. Because the OLT allocates bandwidth based on logical links, an Ethernet port with its own logical link can be guaranteed a minimum upstream bandwidth by the OLT according to a DBA algorithm. But because each logical link reports transmission demands to the OLT each DBA cycle, a large amount of logical links within an EPON would increase upstream overhead (e.g., the upstream bandwidth used by logical links to transmit REPORT messages to the OLT). This in turn could consume a substantial portion of the upstream traffic, leaving the subscribers with insufficient upstream bandwidth.

Therefore, there is a need for a system and process that provides enhanced upstream data traffic management for an EPON by improving the mechanism for allocating upstream bandwidth to queues of a logical link.

SUMMARY OF THE INVENTION

Embodiments of the present invention manage the upstream data traffic for an EPON by adding another level of granularity to the control protocol described in IEEE 802.3ah. Beneficially, this may be done without increasing the upstream overhead.

In one embodiment, local queues of a logical link of an ONU are grouped into one or more queue containers. The logical link submits transmission demands of all of its local queues to the OLT in a bandwidth request message. The OLT maps the queues into associated queue containers, allocates upstream transmission windows based on the bandwidth request from each queue container, and then submits a bandwidth allocation message to the logical link describing the allocation of the upstream transmission windows. For each queue container, the logical link divides the upstream transmission window allocated to it and assigns to the associated local queues. It is noted that depending on the transmission demands and the priorities of the associated local queues, the logical link can assign the upstream transmission window to a single local queue.

One method for providing quality of service to multiple Ethernet ports supported by the same logical link is as follows. Each Ethernet port is associated with a different queue container, and all transmission demands from an Ethernet port are reflected in queues associated with the corresponding queue container. The logical link submits transmission demands of all of its local queues to the OLT. The OLT allocates transmission windows to queue containers and submits the allocation to the logical link. The logical link assigns the allocated transmission windows to local queues based on the queues' association with the queue containers, guaranteeing the quality of service of each Ethernet port supported by the logical link.

Embodiments of the invention provide enhanced upstream data traffic management for EPON without incurring additional upstream overhead. In this way, the OLT can guarantee a minimum bandwidth allocation to a subset of queues of a logical link. Moreover, this feature also allows one logical link to support multiple Ethernet ports with bandwidth allocations made separately for each Ethernet port by the OLT. Beneficially, these benefits can be achieved by using the existing REPORT/GATE coordination methods defined by IEEE 802.3ah without modification.

DETAILED DESCRIPTION OF THE EMBODIMENTS

Overview of System Architecture

Figure 1:
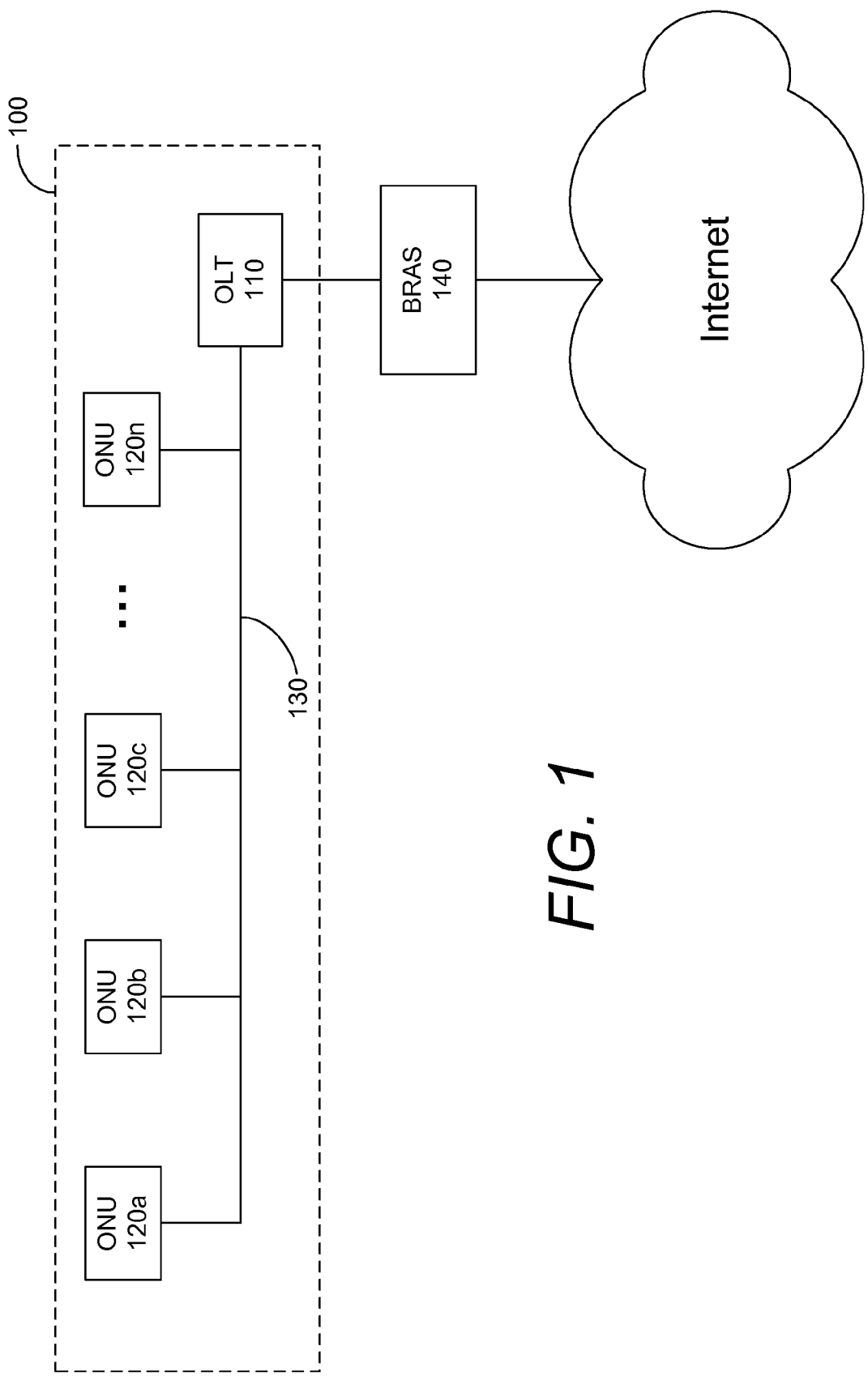
FIG. 1 is a block diagram illustrating an architecture for one embodiment of the present invention.

Referring to FIG. 1, there is shown a block diagram illustrating the architecture of one embodiment of an EPON 100 with enhanced upstream data traffic management. The EPON 100 includes an OLT 110, multiple ONUs 120a-n, and an optical fiber 130. The EPON 100 is an Internet Service Provider (ISP) network, but it can be any other large scale network system.

In the EPON 100, the OLT 110 is connected to a number of ONUs 120a-n through passive optical components, such as optical fiber 130, splices (not shown), and splitters (not shown). The OLT 110 is also connected to a broadband remote access server (BRAS) 140 through a network, which may be a wired or wireless network. Examples of the network include the Internet, an intranet, a cellular network, or a combination thereof. The BRAS 140 is connected to the Internet.

The OLT 110 is a network-end Data Terminal Equipment (DTE) that connects the EPON 100 with external networks. The OLT 110 is typically located at the central office of the ISP network. All data communication in the EPON 100 must go through the OLT 110, including those between two ONUs 120 of the EPON 100. Depending on what kind of signal it receives from the external networks, the OLT 110 might need to convert electrical signals from the external networks to optical signals for the EPON 100. Similarly, the OLT 110 may convert optical signals from the EPON 100 to electrical signals to the external networks.

Each of the ONUs 120a-n is a network element that converts optical signals from the optical fiber 130 into electrical signals for the subscriber' home communications equipment. In the other direction, the ONUs 120a-n converts electrical signals from the subscribers' equipment into optical signals for the optical fiber 130. The ONUs 120a-n are typically located at the subscriber premises, providing the subscribers with network access. For example, an ONU 120 can support one or more Ethernet ports for the subscriber to access the EPON 100. In another embodiment, an ONU 120 supports several subscribers connected to the ONU 120, e.g., via a DSL connection.

Each of the ONUs 120a-n is associated with one or more logical links. A logical link is an entity that enables/controls/manages the upstream traffic within the EPON 100 along with other logical links of the EPON 100. A logical link transmits/receives data to/from the OLT 110 within the EPON 100. Each logical link is identified with a logical link identifier (LLID) unique within the EPON 100. The number of logical links per ONU 120 is a design choice, and each of the ONUs 120a-n is initially associated with one logical link. Depending on each subscriber's need, an ONU 120 can be associated with multiple logical links. The modification of logical links associated with an ONU 120 can be controlled by the BRAS 140, through the OLT 110, as described below. Logical links are typically allocated by the OLT 110. The process of the OLT 110 allocating a logical link to a ONU 120 is transparent to other ONUs 120 of the EPON 100.

Figure 2:
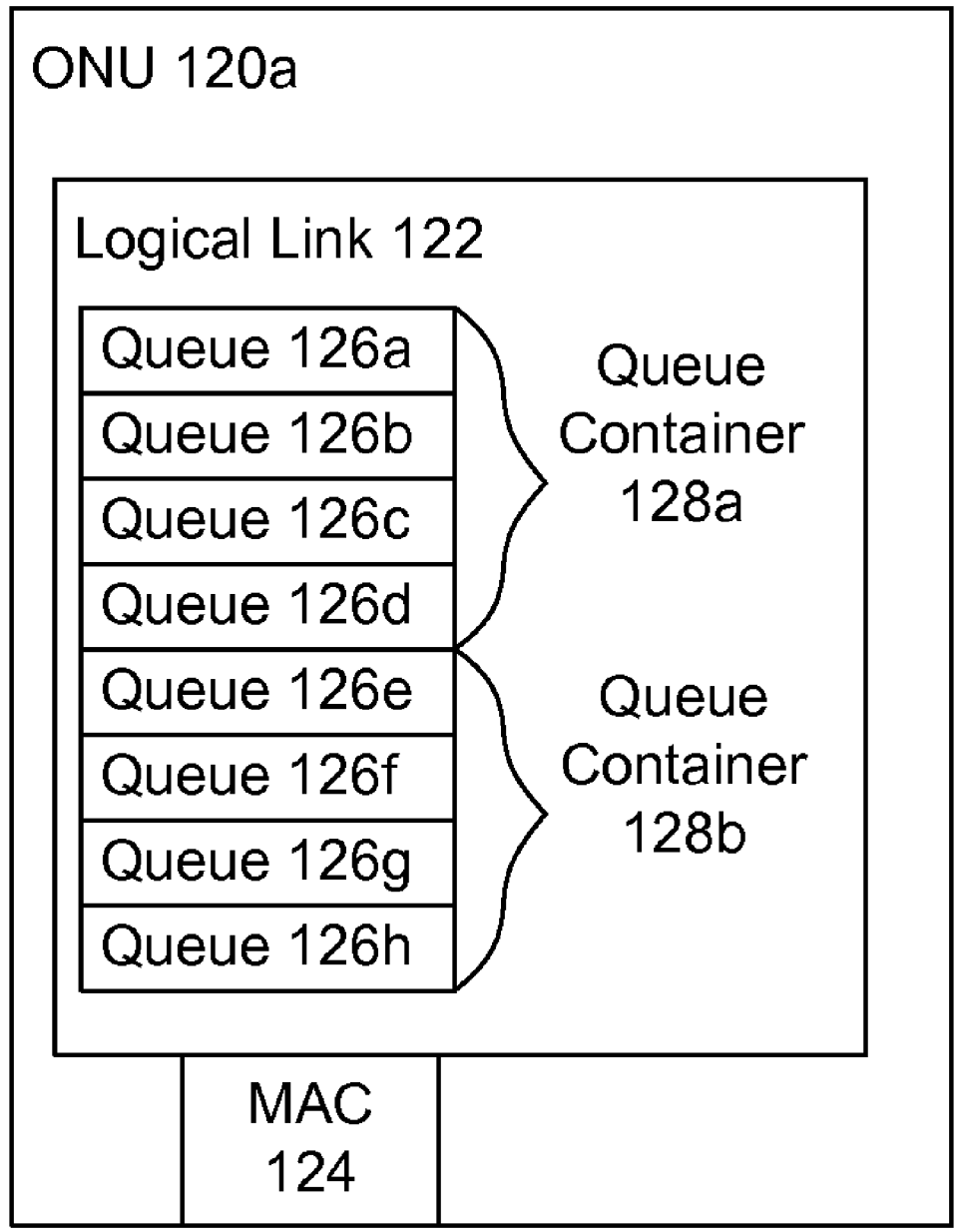
FIG. 2 is a block diagram illustrating an ONU in accordance with preferred embodiments of the invention.

The ONU 120a, an ONU 120 associated with a logical link 122, is illustrated in FIG. 2. The logical link 122 is associated with a Media Access Control (MAC) port 124 of the ONU 120a. The logical link 122 maintains queues 126a-h for different traffic priorities. The queue 126a containing real-time voice packets may have priority over the queue 126h containing data packets (which may contain lower priority web or peer-to-peer traffic). The logical link 122 also maintains one or more queue containers 128a-b, whereby one or more queues of the logical link 122 are associated with a queue container 128. For example, the queues 126a-d are associated with the queue container 128a and the queues 126e-h are associated with the queue container 128b. In this way, the queue containers 128 can be created for various types of traffic for the logical link 122, thereby allowing the EPON 100 to guarantee bandwidth for the types of traffic separately. For example, the queue container 128a can be created for real-time traffic and the queue container 128b for all other traffics. This allows the EPON 100 to guarantee a maximum/minimum upstream transmission window for various types of traffic.

Referring back to FIG. 1, the BRAS 140 is a node that connects the ISP network with the Internet through the ISP's backbone network. The BRAS 140 is typically located at the core of an ISP's network. It routes network traffics to and from the ISP network and provides firewall, authentication, and routing services for subscribers. The BRAS 140 has access to the MAC addresses of the ONUs 120 of the EPON 100. The BRAS 140 also gives the service provider the support it needs to manage subscribers and their service rights. For example, administrators can remotely modify logical link configurations in an ONU 120, such as adding or removing a logical link to the ONU 120, at the BRAS 140. The BRAS modifies the logical link configurations indirectly through the OLT 110.

The EPON 100 operates according to the multi-point control protocol (MPCP) defined in IEEE 802.3ah. In the downstream direction (from the OLT 110 to an ONU 120), the data traffic is standard Ethernet traffic. Signals transmitted by the OLT 110 pass through a 1:N passive splitter (or cascade of splitters) and reach every ONU 120a-n. Before transmitting any Ethernet frame within the EPON 100, the OLT 110 inserts the LLID corresponding to the destination logical link in the preamble of the frame. Only the logical link associated with the LLID in the preamble of an Ethernet frame can accept the frame.

In the upstream direction (from an ONU 120 to the OLT 110), the signal transmitted by an ONU 120 only reaches the OLT 110, but not other ONUs 120. To avoid conflict of simultaneous upstream transmissions, the MPCP applies Time Division Multiple Access (TDMA) technology to control the upstream traffic.

The MPCP splits upstream traffic time into DBA cycles and uses a report/grant mechanism to allocate upstream transmission windows among the logical links in the EPON 100. Within a DBA cycle, each logical link reports the upstream transmission demands by its local queues to the OLT 110 by sending a REPORT message describing the transmission demands to the OLT 110. The OLT 110 identifies each queue's association with queue containers and determines upstream transmission windows allocation for each of the queue containers according to a DBA algorithm. The DBA algorithm is based on Service Level Agreement (SLA) parameters and the transmission demands received by the OLT 110. The OLT 110 then sends a GATE message describing the allocation to the appropriate logical link during the next DBA cycle. Alternatively, instead of sending demands to the OLT 110 from every logical link, only those logical links with actual transmission demands send the REPORT message, and the OLT 110 only responds to those logical links who demanded. In other embodiments, the OLT 110 can send requests for REPORT messages to each ONU 120 and allocate an upstream bandwidth for the REPORT messages so the allocated bandwidth will not be used for other purposes whether the ONUs 120 respond the requests with a REPORT message or not. The OLT 110 is in complete control of the upstream bandwidth.

Figure 3:
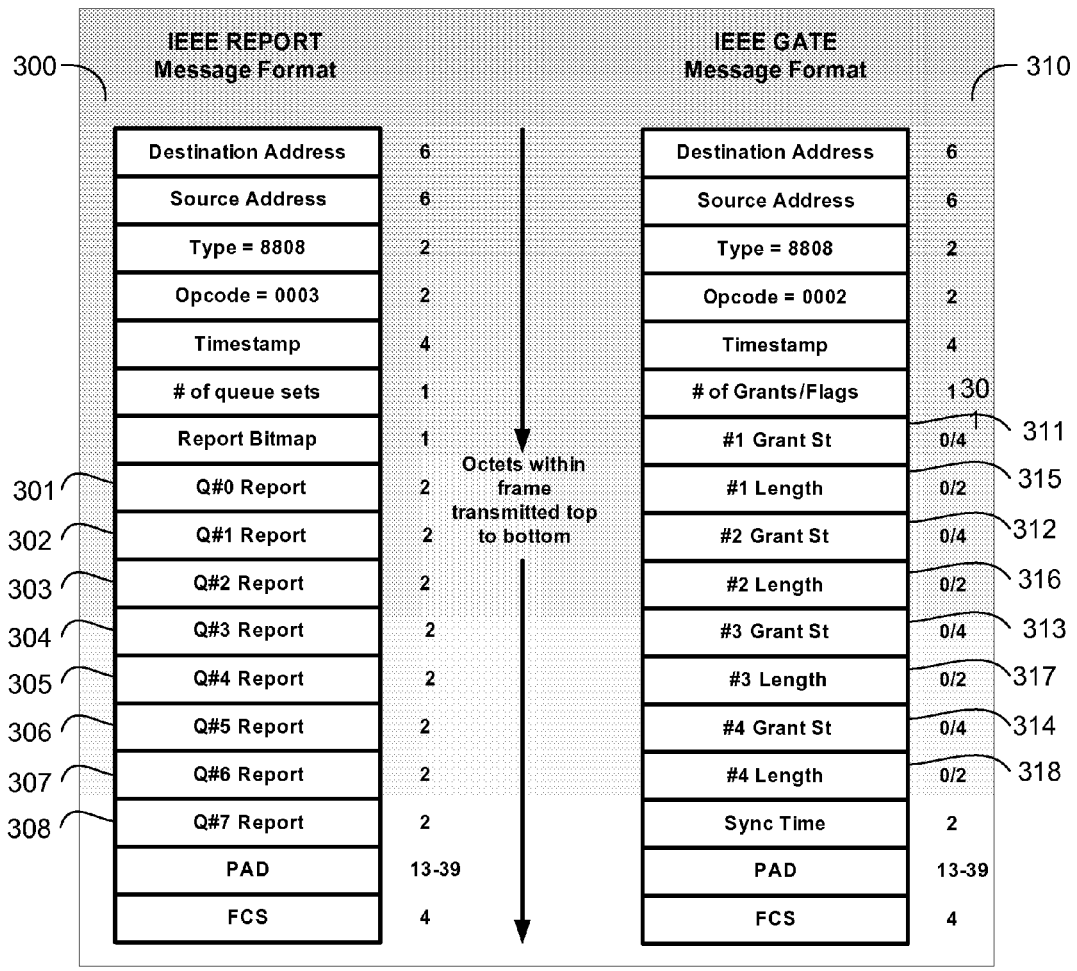
FIG. 3 is a diagram illustrating the standard format for a REPORT message and a GATE message as defined in IEEE 802.3ah in accordance with preferred embodiments of the invention.

The standard formats of a REPORT message 300 and a GATE message 310, as defined in IEEE 802.3ah, are shown in FIG. 3. As described above, a REPORT message is sent from a logical link to the OLT 110 for purpose of notifying the OLT 110 the upstream transmission demands by local queues of the logical link. The REPORT message 300 contains up to eight upstream transmission demands, saved in Queue Reports 301-308. A GATE message is sent from the OLT 110 to a logical link for purpose of notifying the logical link the allocation of upstream transmission windows to queue containers of the logical link. The GATE message 310 contains up to four grants, saved in Grant Start Times 311-314 and the corresponding Lengths 315-318. Each of the Grant Start Times 311-314 represents the start time of the transmission window granted. Each of the corresponding Lengths 315-318 represents the length of the transmission window granted.

Under the MPCP as defined in IEEE 802.3ah, the OLT 110 allocates a transmission window to a logical link and does not control how the logical link allocates bandwidth among the queues within the logical link. Because the OLT 110 needs to make no more than one grant per logical link, it only needs to use the Grant Start Time 311 and the Length 315 of the GATE message 310. The OLT 110 as described above allocates transmission windows to queue containers of a logical link. Because a logical link can be associated with multiple queue containers in accordance with embodiments of the invention, the OLT 110 may need to make multiple grants to a logical link, each grant for a queue container. It follows that the OLT 110 may use the Grant Start Times 311-314 and the Lengths 315-318 of the GATE message 310 to notify the logical link of any additional transmission window allocations.

Because the OLT 110 allocates upstream transmission window based on queue containers, queues associated with a queue container as a whole are guaranteed a minimum bandwidth, even if all the queues are of lower priority.

In addition, because the OLT 110 allocates multiple grants for different queue containers of the same logical link, the multiple granted upstream bandwidths can be 'back-to-back'. That is, the start time of the second grant is immediately after the end time of the first grant. This kind of bandwidth allocation eliminates any allowances for laser on/off times and OLT clock re-synchronization times, which would otherwise consume significant upstream bandwidth.

Overview of Methodology

Figure 5:
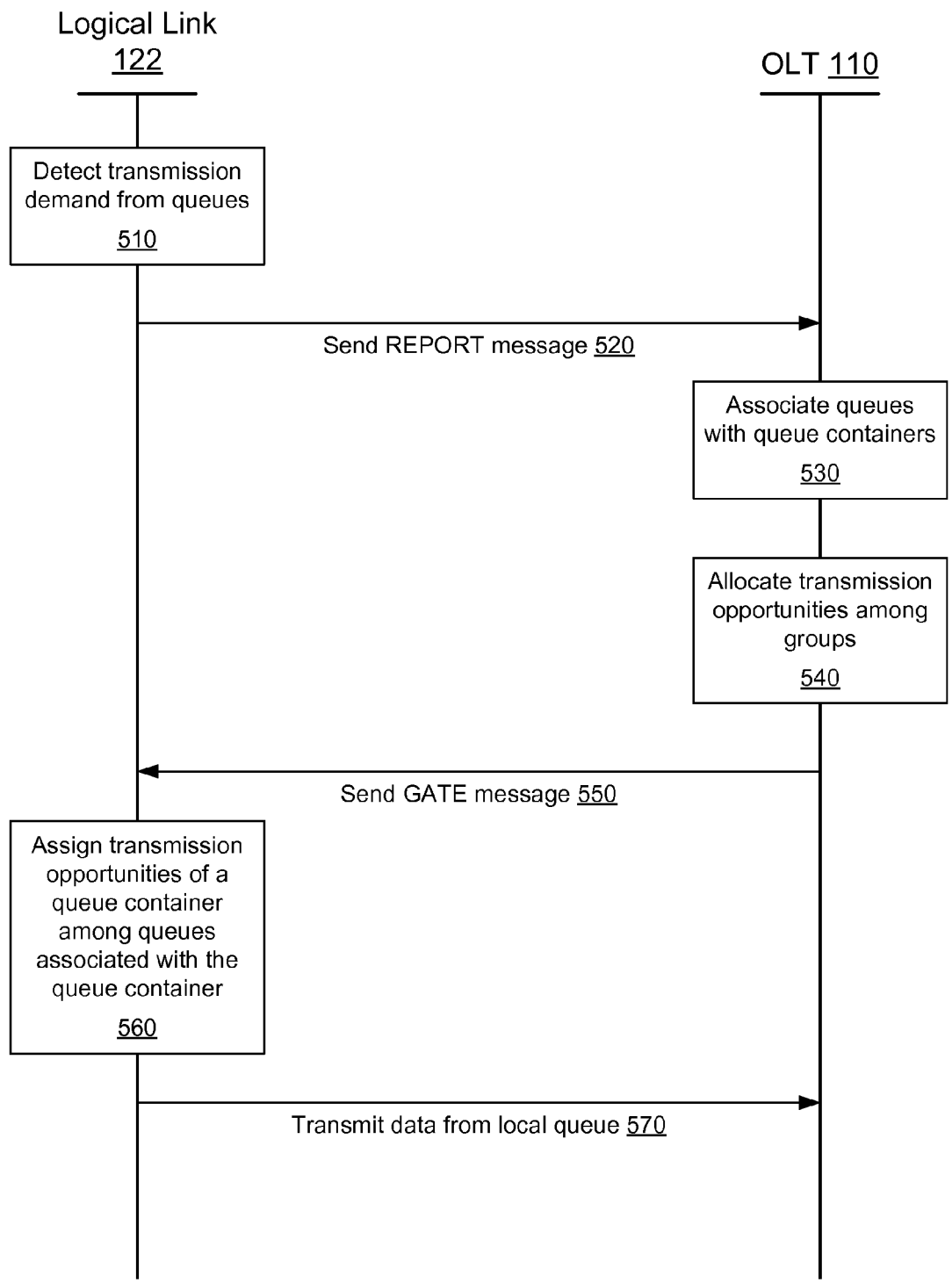
FIG. 5 is a trace diagram for one embodiment of a method for enhancing upstream data traffic management for EPON in accordance with a preferred embodiment of the invention.

Referring now to FIG. 5, there is shown a trace diagram depicting an exemplary method for providing enhanced upstream data traffic management for the EPON 100 according to one embodiment of the present invention. The steps of the process illustrated in FIG. 5 may be implemented in software, hardware, or a combination of hardware and software.

Figure 4A:
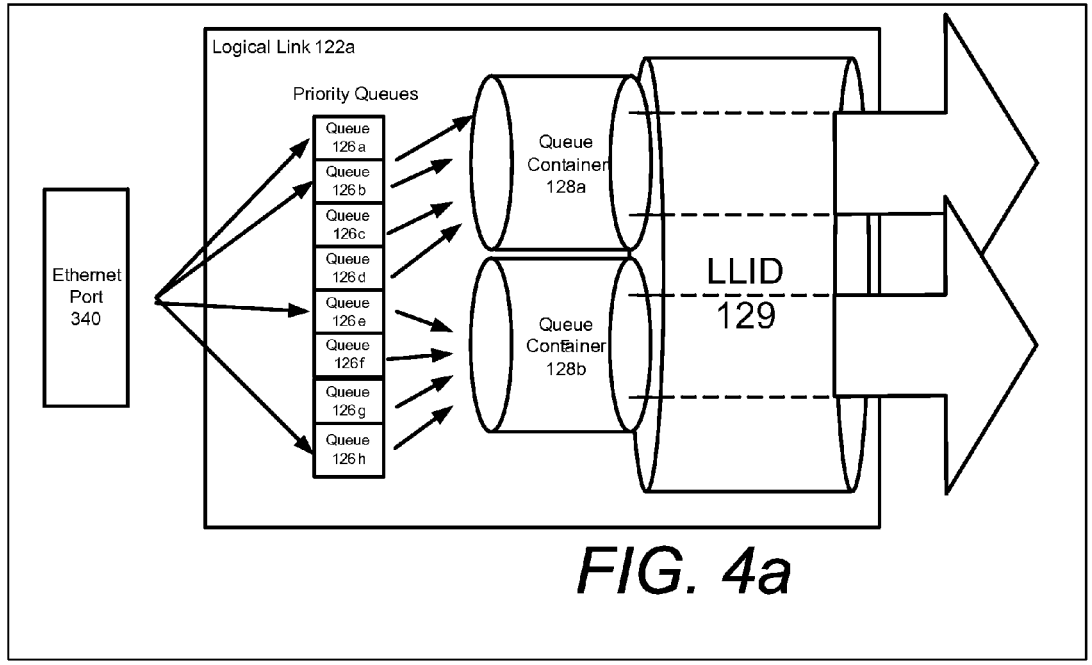
FIGS. 4a-b illustrate two examples of queue container implementations in a logical link in accordance with an embodiment of the invention.

The diagram shown in FIG. 5 will now be described in detail, illustrated by the example in FIG. 4a. FIG. 4a shows logical link 122 of the ONU 120a in the EPON 100. The logical link 122 has eight queues 126a-h, each corresponding to a different transmission priority. The queue 126a has the highest priority and the queue 126h has the lowest priority. The logical link 122 has two queue containers 128a, 128b. The queue container 128a is associated with four queues 126a-126d, and the queue container 128b is associated with four queues 126e-126h. The logical link 122 is associated with an LLID 129. The logical link 122 provides the subscriber with one Ethernet Port 340.

In one embodiment, the creation of queue containers in a logical link and their association with the local queues of the logical link is configured in the OLT 110 by the BRAS 140. The BRAS 140 then communicates such configuration to the OLT 110 and the logical link hosting the queue containers. In another embodiment, subscribers are allowed to create queue containers in their logical links, and associate the queue containers to the local queues. The logical links then communicate such configuration to the OLT 110.

Referring to FIG. 5, the logical link 122 detects 510 transmission demands from the local queues 126a-h and generates a REPORT message based on the transmission demands of the queues. In the example illustrated in FIG. 4a, a subscriber using the Ethernet port 340 creates transmission demands with four different priorities. The four priorities correspond to four queues 126a, 126b, 126e, and 126h.

An example of the transmission demands are as follows.

| Queue ID | Transmission demand (Time Units) |
|---|---|
| 126a | 32 |
| 126b | 478 |
| 126c | 0 |
| 126d | 0 |
| 126e | 59 |
| 126f | 0 |
| 126g | 0 |
| 126h | 21 |

As illustrated in the above table, the subscriber participates in an online video conference, causing the queue 126a to have a transmission demand of 32 time units for audio data transmission, and causing the queue 126b to have a transmission demand of 478 time units for video data transmission. At the same time, an email application in the subscriber's computer synchronizes emails with an email server, causing the queue 126e to have a transmission demand of 59 time units, and an anti-virus application updates its library of virus definitions, causing the queue 126h to have a transmission demand of 21 time units.

The logical link 122 detects 510 the above transmission demands from local queues 126a-126h, and generates a REPORT message as defined in IEEE 302.3ah and illustrated in FIG. 3. The section of the REPORT message containing upstream transmission demands is as follows.

| Field Name | Field Value |
|---|---|
| Report Bitmap | $(11001001)_2$ |
| Q#0 Report | 32 |
| Q#1 Report | 478 |
| Q#2 Report | 59 |
| Q#3 Report | 21 |
| Q#4 Report | 0 |
| Q#5 Report | 0 |
| Q#6 Report | 0 |
| Q#7 Report | 0 |

The value of the Report Bitmap field of the REPORT message indicates that only transmission demands of queues number 0, 1, 4, and 7 are reported in the REPORT message. In another embodiment, transmission demands are stored in the field corresponding to the queue as showed in the following chart.

| Field Name | Field Value |
|---|---|
| Report Bitmap | $(11001001)_2$ |
| Q#0 Report | 32 |
| Q#1 Report | 478 |
| Q#2 Report | 0 |
| Q#3 Report | 0 |
| Q#4 Report | 80 |
| Q#5 Report | 0 |
| Q#6 Report | 0 |
| Q#7 Report | 21 |

After generating the REPORT message, the logical link 122 sends 520 the message to the OLT 110. Because the act of sending the REPORT message itself takes upstream bandwidth, an upstream transmission window is assigned for this purpose. There are several different approaches to obtain the upstream transmission window for the logical link 122 to send 520 the REPORT message. In one embodiment, the REPORT message is placed in one of the local queues 126a-h, just like all other upstream traffic, and is allocated bandwidth by the logical link 122 similar to all other upstream traffic. In another embodiment, the OLT 110 describes a transmission window for the REPORT message in one of the four grants in the GATE message, separate from other grants to the logical link 122. In yet another embodiment, a transmission window is reserved in each DBA cycle for the logical link 122 to send the REPORT message to the OLT 110.

The OLT 110 associates 530 the queues described in the REPORT message with queue containers. Because the OLT 110 is aware of the association of queues and queue containers, it can calculate the transmission demand for a queue container by adding the transmission demands of all queues associated with that queue container. In the example illustrated in FIG. 4a, the queue container 128a is associated with the queues 126a-d, and the queue container 128b is associated with the queues 126e-h. Thus, the transmission demand for queue container 128a is 32+478=510 time units, and the transmission demand for queue container 128b is 59+21=80 time units.

The OLT 110 then allocates 540 transmission windows among the queue containers of logical link 122. In one embodiment, the OLT 110 applies a DBA algorithm with SLA parameters setting the maximum/minimum transmission window grants of queue containers and the logical link 122. In the example illustrated in FIG. 4a, it is assumed that each queue container 128 has a maximum/minimum transmission window of 150/50 time units, and each logical link has a maximum/minimum transmission window of 400/200 time units. As a result, the OLT 110 allocates the queue container 128a 150 time units, and the queue container 128b 80 time units.

The OLT 110 generates a GATE message, as defined in IEEE 302.3ah and illustrated in FIG. 3, based on the transmission window allocation among queue containers 128a and 128b. The OLT 110 then sends 550 the GATE message to the logical link 122. In the example illustrated in FIG. 4a, the section of the GATE message containing transmission window allocation is as follows.

| Field Name | Field Value |
|---|---|
| #1 Grant Start Time | $(0D70)_{16}$ |
| #1 Length | 150 |
| #2 Grant Start Time | $(0E06)_{16}$ |
| #2 Length | 59 |
| #3 Grant Start Time | 0 |
| #3 Length | 0 |
| #4 Grant Start Time | 0 |
| #4 Length | 0 |

The logical link 122 assigns 560 the transmission window allocated to a queue container among the queues associated with the queue container. In the example illustrated in FIG. 4a, the logical link 122 assigns 560 150 time units transmission window granted to queue container 128a between queues 126a and 126b, and assigns 560 80 time units transmission window granted to queue container 128b between queues 126e and 126h.

In one embodiment, the logical link 122 satisfies the transmission demands of higher priority queues before assigning 560 any remaining transmission windows to lower priority queues. Under this embodiment, the logical link 122 assigns 480 the queue 126a 32 time units, the queue 126b 118 time units, the queue 126e 59 time units, and the queue 126h 21 time units.

After the logical link 122 assigns upstream transmission windows to local queues, it sequentially transmits 570 upstream traffic data from the local queues with assigned upstream transmission windows. Such transmission starts at the grant start time and lasts the length as indicated in the GATE message.

It is noted that by adding another level of granularity to the control protocol described in IEEE 802.3ah specification, the lower priority queues can be guaranteed a quality of service without increasing the upstream bandwidth overhead. Under the conventional control protocol described in IEEE 802.3ah specification, the OLT 110 grants one transmission window per logical link and leaves it to the logical link to divide the granted transmission window among the local queues. Here, if logical link 122 prioritizes higher priority queues, under the conventional control protocol, queues 126e and 126h would not be assigned to any transmission windows because queue 126b has a higher priority and continuously demands a large transmission window, leaving nothing for the lower priority queues 126e and 126h.

It is further noted that in alternative embodiments, logical link 122 may support up to four queue containers, providing more capacity to fine-tune and enhance the upstream data traffic management for the EPON 100.

Figure 4B:
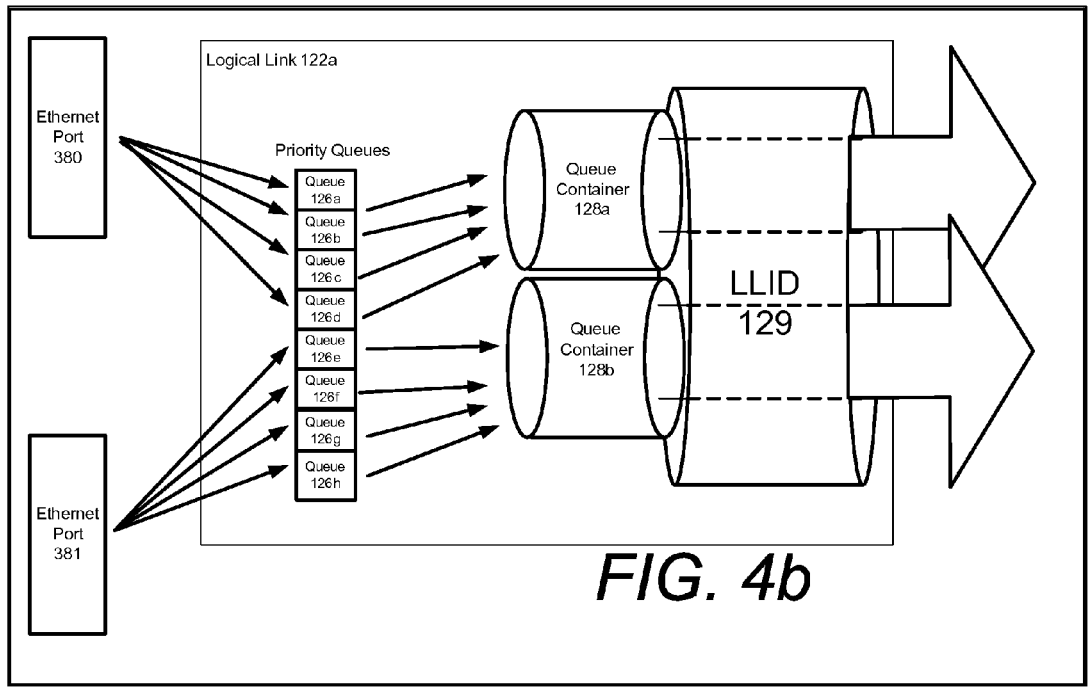

As illustrated by the example in FIG. 4b, this enhanced upstream data traffic management for the EPON 100 can provide quality of service control for multiple Ethernet ports supported by a logical link. FIG. 4b shows logical link 122 of the ONU 120a in the EPON 100 with a different configuration. Same as the configuration illustrated in FIG. 4a, the logical link 122 has eight queues 126a-h, each corresponding to a different priority of transmission demands. The queue 126a has the highest priority, and the queue 126h has the lowest priority. Logical link 122 provides the subscriber with two Ethernet ports 380 and 381. Traffic from the Ethernet port 380 is mapped into queues 126a-d, and traffic from the Ethernet port 381 is mapped into queues 126e-h. Like the configuration illustrated in FIG. 4a, the logical link 122 has two queue containers 128a and 128b. The queue container 128a is associated with four queues 126a-d, the queues to which the traffic from the Ethernet port 380 maps, and the queue container 371 is associated with four queues 126e-h, the queues to which the traffic from the Ethernet port 381 maps.

As shown above in the example illustrated in FIG. 4a, the method illustrated in FIG. 5 can provide a quality of service to queues associated with a queue container. By mapping the network traffics of an Ethernet port to queues associated with a queue container, this method also guarantees a quality of service to separate Ethernet ports associated with a single logical link. Thus, in FIG. 4b, the method provides an enhanced quality of service to Ethernet ports 380 and 381. It is noted that in alternative embodiments, logical link 122 may support up to four queue containers, each associated with one or more Ethernet ports.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for enhancing traffic management for an optical line termination (OLT) in an optical communication system, the method comprising:
identifying, by the OLT, associations of a plurality of queues of data packets in an optical network unit (ONU) with a plurality of queue containers in the ONU, wherein each queue container hosts two or more of the plurality of queues of data packets and each of the plurality of queues is hosted by one and only one such queue container, each of the plurality of queues being associated with a different traffic priority;
receiving, by the OLT, a first message from the ONU in the optical communication system through a network, the first message specifying transmission demands for transmitting the data packets in the plurality of queues through the network;
determining, by the OLT, an allocation of transmission windows among the plurality of queue containers based at least in part on the transmission demands specified in the first message;
generating, by the OLT, a second message containing the allocation of transmission windows; and
communicating, by the OLT, the second message to the ONU through the network.

2. The method of claim 1, wherein data packets containing the first message are in a queue associated with a high traffic priority.

3. The method of claim 1, wherein the ONU is communicatively coupled to a plurality of Ethernet ports, and wherein each of the plurality of queue containers being associated with one and only one Ethernet port and hosting queues of data packets originated from the associated Ethernet port.

4. The method of claim 1, wherein the OLT is configured to provide a guaranteed quality of service for each of the plurality of queue containers.

5. The method of claim 4, wherein the guaranteed quality of service for a queue container comprises a guaranteed minimum bandwidth to be shared by queues hosted by the queue container.

6. The method of claim 1, wherein the ONU comprises a logical link.

7. The method of claim 1, wherein the first message is a REPORT message as defined in IEEE 802.3ah and the second message is a GATE message as defined in IEEE 802.3ah.

8. An optical line termination (OLT) in an optical communication system, comprising:
a chipset; and
a memory unit comprising a persistent memory that contains microcode for execution by the chipset to cause the chipset to perform the operations:
identifying associations of a plurality of queues of data packets in an optical network unit (ONU) with a plurality of queue containers in the ONU, wherein each queue container hosts two or more of the plurality of queues of data packets and each of the plurality of queues is hosted by one and only one such queue container, each of the plurality of queues being associated with a different traffic priority;
receiving a first message from the ONU in the optical communication system through a network, the first message specifying transmission demands for transmitting the data packets in the plurality of queues through the network;
determining an allocation of transmission windows among the plurality of queue containers based at least in part on the transmission demands specified in the first message;
generating a second message containing the allocation of transmission windows; and
communicating the second message to the GNU through the network.

9. The OLT of claim 8, wherein data packets containing the first message are in a queue associated with a high traffic priority.

10. The OLT of claim 8, wherein the ONU is communicatively coupled to a plurality of Ethernet ports, and wherein each of the plurality of queue containers being associated with one and only one Ethernet port and hosting queues of data packets originated from the associated Ethernet port.

11. The OLT of claim 8, wherein the OLT is configured to provide a guaranteed quality of service for each of the plurality of queue containers.

12. The OLT of claim 11, wherein the guaranteed quality of service for a queue container comprises a guaranteed minimum bandwidth to be shared by queues hosted by the queue container.

13. The OLT of claim 8, wherein the ONU comprises a logical link.

14. The OLT of claim 8, wherein the first message is a REPORT message as defined in IEEE 802.3ah and the second message is a GATE message as defined in IEEE 802.3ah.

* * * * *

UNITED STATES PATENT AND TRADEMARK OFFICE
CERTIFICATE OF CORRECTION

PATENT NO. : 7,639,694 B2 Page 1 of 1
APPLICATION NO. : 11/379500
DATED : December 29, 2009
INVENTOR(S) : Joseph G. DeCarolis et al.

It is certified that error appears in the above-identified patent and that said Letters Patent is hereby corrected as shown below:

Column 10, claim 8, line 43, delete "GNU", and insert -- ONU --.

Signed and Sealed this

Eighth Day of June, 2010

David J. Kappos
*Director of the United States Patent and Trademark Office*